United States Patent Office 3,418,235
Patented Dec. 24, 1968

3,418,235
MOLECULAR SIEVE SEPARATION PROCESS
David W. Savage, Westfield, Maurice G. Lorenz, North Plainfield, and William J. Asher, Cranford, N.J., assignors to Esso Research and Engineering Company, a corporation of Delaware
No Drawing. Filed Sept. 24, 1965, Ser. No. 490,089
4 Claims. (Cl. 208—310)

ABSTRACT OF THE DISCLOSURE

The problem of bed lifting in a cyclic molecular sieve adsorption-desorption process wherein desorption is effected with a displacing agent, such as ammonia, is solved by making use of a co-current adsorption-desorption cycle at temperatures between 700° and 800° F.

---

This invention relates to an improved molecular sieve separation process. More particularly, the process of the instant invention concerns an improvement in molecular sieve separations wherein increased economy and efficiency are realized. This is accomplished by introducing a displacing agent in a co-current direction as adsorbable material had previously been introduced into a molecular sieve separation zone. Additionally, a critical temperature of 700° to 800° F. must be utilized during desorption.

The displacing agents which may be used in accordance with this invention are highly polar components. The sieve materials that can be used in accordance with the present invention are the molecular sieve materials which have the capacity to separate hydrocarbons by basis of molecular shape as exemplified by the separations of normal paraffins from non-normal paraffins or by an affinity of the hydrocarbons for the sieve material. This latter principle is used to separate aromatics from other materials.

It has been known for some time that certain zeolites, both naturally occurring and synthetic, have the property of separating normal from isomeric branched-chain hydrocarbons as well as cyclic and aromatic admixtures. The zeolites have crystal patterns such as deformed structures containing a large number of small cavities interconnected by a number of still smaller holes or pores, the latter being of exceptionally uniform size. Only molecules small enough to enter the pores can be adsorbed though not all molecules even though small enough to enter the pores will be adsorbed. An affinity of the molecule for the adsorbent must be present. The pores may vary in diameter from 3 to 6 A. units to 8 to 15 or more A. units but it is a property of these zeolites or molecular sieves that for a particular size the pores are of substantially uniform size. The adsorbents with pore sizes of 8 to 15 A. units have a high selectivity for aromatics and non-normal hydrocarbons whereas the smaller adsorbents, with respect to pore size, that is to say those of about 3 to 6 A. units have a high selectivity for straight-chain compounds such as normal paraffins and normal olefins. The adsorbents with pore sizes of 8 to 15 A. units are known as type X sieves. Recently, a variety of new sieves have been discovered including type Y molecular sieve. This invention is applicable to this type of sieve in addition to those described above.

The scientific and patent literature contains numerous references to the adsorbing action of natural and synthetic zeolites. Among the natural zeolites having this sieve property may be mentioned chabazites and analcite. A synthetic zeolite with molecular sieve properties is described in U.S. Patent 2,442,191. An example of a class of synthetic zeolites which is used to separate normal hydrocarbons from branched hydrocarbons is type A sieve with divalent cations from the alkaline earth series particularly calcium type A. These adsorbents are described in U.S. Patent 2,882,243. An example of a class of adsorbents which is used to separate aromatics and non-hydrocarbons from saturates is type X sieve with monovalent and divalent cations from the alkaline and alkaline earth series particularly sodium and calcium type X. These adsorbents are described in U.S. Patent 2,882,244. Zeolites vary somewhat in composition but generally contain silica, aluminum, oxygen and an alkali and/or alkaline earth element, e.g., sodium and/or calcium, magnesium, etc. Analcite has the empirical formula: $NaAlSi_2O_6 \cdot H_2O$. Barrer (U.S. Patent 2,306,610) teaches that all or part of the sodium is replaceable by calcium to yield on dehydration, a molecular sieve having the formula: $(CaNa_2)Al_2Si_4O_{12} \cdot 2H_2O$. Black (U.S. Patent 2,522,426) describes a synthetic molecular sieve having the formula: $4CaO \cdot Al_2O_3 \cdot 4SiO_2$. A large number of other naturally occurring zeolites having molecular sieve activity, i.e., the ability to adsorb a straight-chain hydrocarbon and exclude the branched-chain isomers, are described in an article "Molecular Sieve Separation of Solids" appearing in Quarterly Reviews, vol. 3, 293–330 (1949) and published by the Chemical Society (London).

Recently, a process has been devised for the separation of normal paraffins from admixture with other hydrocarbons. This process, as discussed in U.S. Patent 3,070,542, teaches a countercurrent adsorption-desorption wherein the normal paraffin containing mixture is passed into a molecular sieve separation zone. The paraffins are adsorbed and the remainder of the mixture passes out of the zone as sievate. At this point, a displacing agent is introduced countercurrently from the direction in which the feedstock was originally introduced. In this fashion, the displacing agent is used to desorb the adsorbed normal paraffins. In another U.S. patent, No. 3,037,338, adsorbed hydrocarbon is desorbed from a molecular sieve by means of carbon dioxide. The desorption can be either countercurrent or co-current depending on the requirements of the situation.

A countercurrent desorption technique does present at least one serious disadvantage. After the bed is loaded with displacing agent and fresh feedstock is passed into the system, there is an acute problem of bed lifting. That is to say, the displacing agent is desorbed so rapidly that it causes the bed of molecular sieve to rise up suddenly with explosive force. There is also considerable breakthrough of adsorbable feed material. That is to say, in the case of a normal paraffin selective sieve, a 5 A. molecular sieve, immediately following introduction of the normal paraffin containing mixture, a large amount of normal paraffin appears in the effluent from the molecular sieve separation zone.

A co-current cycle has been proposed to remedy this bed lifting problem. That is to say, a cycle in which the displacing agent is introduced in the same direction as the feedstock has previously been passed through the adsorbent bed. However, this did not produce satisfactory results either since there was considerable breakthrough of impurities, such as sulfur and aromatics into the latter part of the desorbate whereby the purity of the desorbate was substantially reduced. To rectify this, attempts were made to operate at much more severe conditions, i.e. temperatures of about 850° F. However, at these elevated temperatures, there was considerable cracking of the hydrocarbon mixtures which were utilized. This is, of course, undesirable since needed long chain products were broken into shorter chain lengths. It is also difficult to separate the cracked products from the displacing agent.

According to this invention, it has unexpectedly been discovered that a co-current adsorption-desorption cycle wherein desorption is maintained at a critical temperature will eliminate all of these previously enumerated difficulties. The critical temperature to be utilized during desorption may vary between 700° and 800° F., preferably 725° to 775° F. and most preferably 725° to 765° F.

Thus, in essence the instant invention concerns the introduction of a hydrocarbon mixture containing at least one adsorbable compound into a molecular sieve separation zone. The adsorbable component or components are adsorbed onto the sieve and the remainder passes out as effluent. Following this, displacing agent, which will be more fully described, is passed through the sieve in a co-current direction at a critical temperature. The displacing agent is introduced into the molecular sieve separation zone in the same direction as the feedstock was previously introduced. This is a co-current adsorption-desorption cycle. That is to say, the displacing agent and feedstock are passed into the molecular sieve zone in the same direction. Conventionally, they are passed into the molecular sieve zone in opposite directions, i.e., in countercurrent fashion. The temperature during the displacing cycle is maintained at 700° to 800° F., preferably 725° to 775° F. and most preferably 725° to 765° F. In this manner, bed lifting is prevented, impurities are not found when the adsorbed component is desorbed from the sieve and temperatures are sufficiently low to prevent any degree of cracking in the feedstock.

The displacing agent is defined as a polar or polarizable material having an appreciable affinity for the zeolitic adsorbent compared with the material desired to be desorbed. The displacing agent will generally have a heat of desorption approximately equal to the material it is desired to desorb. Displacing agents are also referred to as desorbents and desorbing media. Suitable displacing agents for the process of this invention include $SO_2$, ammonia, carbon dioxide, $C_1$ through $C_5$ alcohols such as methanol and propanol, glycols such as ethylene and propylene glycol, halogenated compounds such as methyl chloride, ethyl chloride, methyl fluoride, nitrated compounds such as nitromethane and the like. Preferably, the displacing agents are used in the gaseous state. A preferred displacing agent has the general formula:

wherein $R_1$, $R_2$ and $R_3$ are selected from the group consisting of hydrogen and $C_1$ through $C_5$ alkyl radicals. Thus, the desorbing material includes ammonia and the $C_1$ through $C_5$ primary, secondary and tertiary amines with ammonia being preferred and a $C_1$ through $C_5$ primary amines being next in order of preference. Examples of preferred primary amines include ethylamines, methylamines and butylamines and the like. Of course, the displacing agent used must have its critical dimensions small enough to enter the molecular sieve being used.

The instant invention is best operated in the vapor phase but a liquid phase operation is also conceivable. The temperature during adsorption may vary between 200° and 1000° F., preferably 400° to 900° F. and most preferably 500° to 800° F. The pressure during adsorption may vary between 1 and 100 p.s.i.a., preferably 10 to 50 p.s.i.a. and most preferably 15 to 50 p.s.i.a. The amount of feedstock per cycle should vary between .01 to 10 w./w. preferably 0.2 to 5 w./w. and especially preferred 0.3 to 3.0 w./w. Conditions for the displacing cycle should be as follows: a critical temperature of 700° to 800° F., preferably 725° to 775° F. and most preferably 725° to 765° F. The desorption must take place in co-current fashion. Pressure during desorption is substantially the same as during adsorption. Displacing agent should be introduced at a rate of between .01 and 5 w./w., preferably 0.02 to 3 w./w. and most preferably 0.02 to 1 w./w. cycle based on the amount of adsorbent, and depending on the molecular weight of the adsorbate.

A great variety of feedstocks may be treated by the instant invention; they include naphtha, gas oil, lubricating oil, kerosene, etc., in fact, all hydrocarbons from which adsorbable hydrocarbon can be removed by means of a molecular sieve are included. The invention is particularly applicable to removing paraffins from naphtha feedstocks in order to upgrade the naphtha as a motor fuel and simultaneously recover lighter normal paraffins for use in solvent production. However, the invention is equally applicable to removing normal paraffins from kerosene feedstocks in order to recover normal paraffins for use in biodegradable detergents while simultaneously improving the characteristics of the kerosene by reducing the cloud and pour points.

Broadly, this invention may be utilized in the processing of the following feedstocks: West Texas crudes boiling from 460° to 600° F., Iraq crudes boiling between 480° to 580° F. and San Joaquin crudes boiling between 330° to 610° F.

The preferred embodiment of this invention may be described as follows: a naphtha feedstock, which may be obtained from a West Texas or Iraq crude oil, would boil in the range of about 300° to 600° F. This feedstock would contain approximately 20% of normal paraffins, 20% of aromatics, 30% of isohydrocarbons and 30% of cyclic hydrocarbons. In order to remove the normal paraffins from this feedstock, it is to be treated with a Linde 5 A. molecular sieve. It should be emphasized at this point that this invention is equally applicable to the removal of aromatics from hydrocarbon mixtures. The mixture is introduced into a molecular sieve separation zone for an adsorption cycle. The molecular sieve separation zone is maintained at a temperature of 500° to 800° F. and a pressure of 0 to 35 p.s.i.g. The feedstock is introduced at a rate of 0.5 to 2.5 w./w./hr. The adsorption cycle lasts for a period of about 5 to 30 minutes. At this point, the 5 A. molecular sieve is substantially saturated with normal paraffins. The remainder of the feedstock, aromatics, cyclic hydrocarbons and isohydrocarbons have passed out of the molecular sieve separation zone as effluent. At this point, the desorption cycle begins: the desorption cycle has a similar cycle time to adsorption. It lasts approximately 5 to 30 minutes although it should be emphasized that the length of the cycle time is not critical. However, the process for introducing the displacing agent into the molecular sieve separation zone is critical. The displacing agent is introduced in a direction concurrent to that which the feedstock was introduced into the molecular sieve zone. That is to say, the displacing agent will pass through in the same direction as the feedstock had previously been passed through the molecular sieve separation zone. The displacing agent must also be introduced at a critical temperature along with the critical concurrent direction. Thus, during the displacing cycle the molecular sieve separation zone is maintained at a temperature of 725° to 775° F. The displacing agent is introduced into the molecular sieve separation zone at a rate of 0.5 to 3 w./w./hr. Any displacing agent, as enumerated above, may be utilized but for this specific embodiment the most preferred displacing agent is utilized; this is ammonia. After the cycle of about 5 to 30 minutes, desorption is stopped and adsorption again commences. This is continued until the molecular sieve bed must be rejuvenated or regenerated. From the above, it is apparent that this invention may be utilized in the separation of normal paraffins from at least one component of the mixture consisting of aromatics, isohydrocarbons and cyclic hydrocarbons. It may also be utilized to separate aromatics from mixtures including at least one component from the group consisting of normal hydrocarbons, cyclic hydrocarbons and isohydrocarbons.

The technique of the instant invention also eliminates the need for any more than mild hydrotreating of a feedstock which is to be separated in a molecular sieve separation zone.

A nonhydrotreated feed, containing sulfur, cannot be processed satisfactorily in a co-current operation at a temperature below 700° to 725° F. This is because below about 700° F. the sulfur compounds are desorbed at approximately the same rate as the normal paraffins, and thus contaminated the normals. At temperatures above about 725° F., the sulfur compounds are desorbed faster than the normals, giving high n-paraffin purity. With hydrotreated feed this problem does not arise and temperatures below 725° F. can be used.

Example 1

In this example, a feedstock which was an Iraq feedstock boiling in the range of 480° to 600° F. and containing about 21% normal paraffins, 30% isohydrocarbons, 30% cyclic hydrocarbons and about 0.13% sulfur was passed into a molecular sieve separation zone. Within the zone was a 5 A. molecular sieve obtained from the Linde Company. The zone was maintained at a temperature of 725° F. and a pressure of 5 p.s.i.g. This adsorption cycle was continued for a period of about 10 minutes, the feedstock was passed over the molecular sieve bed at a rate of 1.9 w./w./hr. At the end of this time, a desorption cycle was begun. During the desorption cycle, the temperature was raised to 750° F. and the pressure remained constant. The displacing agent, which was ammonia, was introduced in the same direction as the feedstock had previously been introduced into the molecular sieve separation zone. The displacing agent was introduced at a rate of 0.6 w./w./hr. This was continued for about 200 cycles.

There was no evidence of bed lifting when the feedstock was introduced into a bed loaded with displacing agent. Further, there was no immediate breakthrough of adsorbable normal paraffins in the effluent when the feedstock was passed into a bed loaded with ammonia. The purity of the normal paraffins desorbed on the first cycle and the 210th cycle was 99.5%. This is extremely high and there was no evidence of contamination by the sulfur and aromatic compounds which were present in the feedstock. The purity level of the normal paraffins was determined by mass spectroscopy. It should also be noted that the initial 15% of desorbate was recycled since this contains most of the impurities.

Example 2

In this example, the exact conditions of Example 1 were utilized except that the temperature utilized for the desorption was 650° F. rather than 750° F. However, the displacing agent was introduced in a co-current direction as to the direction the feedstock had originally been introduced. Once again the feed was not hydrofined. The initial 10 cycles indicated a purity of 99.5% normal paraffins which was a good purity. However, after 200 cycles the capacity declined and so did recovery. At this point, breakthrough of normal paraffins into the effluent occurred. Loss of recovery, i.e., early breakthrough of a small proportion of the n-paraffins in the feed was evident after 40 to 60 cycles and became progressively worse.

Example 3

In this example, the same conditions as in Example 1 were again utilized except that the temperature of desorption was maintained at about 700° F. For the initial 30 to 50 cycles, this example produced the same results as Example 1. However, after 50 cycles, sulfur and aromatics began to appear in the latter part of the desorbate. This resulted in a purity of normal paraffin recovered which was about 98.5%. There was no recovery decline as in Example 2. However, it is not quite as good as the 99.5% purity which was obtained after 210 cycles in Example 1. Thus, operation at 700° F. is possible but does not produce results at the same level as a 750° F. co-current desorption cycle.

Example 4

In this example, the same conditions as in Example 1 are utilized except that the temperature in desorption is raised to 800° F. When desorbing normal paraffins in the initial 50 cycles, a normal paraffin purity of 99.3% is obtained. This compares favorably with the 99.5% of Example 1. However, after 25 cycles there is some evidence of cracking as indicated by a gas chromatographic investigation and $C_1$–$C_5$ hydrocarbons, the products of cracking, are found. A purity level of about 99.3% is obtained. This is still superior to 650° F. operation of Example 2. However, it is not up to the level of 99.5% normal paraffin which is recovered in Example 1. At this level, operations are still satisfactory though not as outstanding as in Example 1.

Example 5

In this example, Example 5, the same conditions of Example 1 are utilized except that during the displacing cycle the temperature is maintained at 725° F. rather than 750° F. A desorbate containing normal paraffins which are approximately 99.5% pure is obtained. This is substantially identical to the purity in Example 1 and indicates that operations are equally successful at 725° F. as at 750° F.

Example 6

In this example, the exact conditions of Example 1 are utilized except that the temperature during adsorption is maintained at 775° F. A product purity of 99.4% normal paraffins is obtained. This compared favorably with the 99.5% obtained in Example 1.

Example 7

In this example, the exact conditions of Example 1 are again utilized except that desorption takes place at 825° F. There is extensive cracking at this temperature as evidenced by the presence of $C_1$ to $C_5$ hydrocarbons. Consequently, a temperature level of 825° F. is not satisfactory for the instant invention.

Example 8

In this example, the exact conditions of Example 1 are utilized except that desorption takes place in a direction countercurrent to which adsorption had previously occurred. That is to say, that the displacing agent, which is ammonia, is introduced into the molecular sieve separation zone in the opposite direction as the feedstock is introduced into the zone. Upon the introduction of fresh feedstock into the zone, there is considerable bed lifting as evidenced by visible turbulence within the molecular sieve bed. The temperature during adsorption is maintained at 750° F. in a similar fashion to Example 1. Thus, the use of countercurrent adsorption-desorption cycles may well be disastrous at the same temperature level that co-current adsorption-desorption cycles produce highly satisfactory results.

It should be noted that many variations of the instant process are well within the skill of one versed in the art. This would include the recycling of the first 10 to 75% of the desorbate in order to maintain maximum purity. Further, some displacing agent, such as ammonia, may be introduced along with the feedstock to facilitate adsorption.

Although this invention has been described with some degree of particularity, it is intended only to be limited by the attached claims.

What is claimed is:

1. A molecular sieve separation process wherein normal paraffins are separated from admixtures including at least one component selected from the group consisting of isoparaffins, cyclic hydrocarbons, and aromatics which comprises contacting said admixture with a type A molecular sieve in a molecular sieve separation zone wherein said normal paraffins are adsorbed onto said sieve, desorbing said normal paraffins with a displacing agent selected from the group of compounds having the general formula,

wherein $R_1$, $R_2$ and $R_3$ are selected from the group consisting of hydrogen and $C_1$ through $C_5$ alkyl radicals, said displacing agent being adsorbed onto said sieve, reintroducing said admixture into said separation zone and thereby removing said displacing agent from said sieve, said admixture being introduced into said molecular sieve in the same direction as said displacing agent, maintaining said molecular sieve separation zone at a temperature of 700° to 800° F. during said adsorption whereby bedlifting is substantially eliminated.

2. A process for the separation of normal paraffins from admixture with at least one component selected from the group consisting of aromatics, cyclic hydrocarbons and isohydrocarbons which comprises passing said mixture into a molecular sieve separation zone, said zone containing a 5 angstrom molecular sieve whereby said normal paraffins are adsorbed, desorbing said normal paraffins with a polar displacing aget selected from the group of compounds having the general formula,

wherein $R_1$, $R_2$ and $R_3$ are selected from the group consisting of hydrogen and $C_1$ through $C_5$ alkyl radicals, whereby said polar displacing agent is adsorbed onto said molecular sieve, reintroducing said mixture into said molecular sieve separation zone thereby removing said polar displacing agent from said sieve, said mixture being introduced in the same direction as the said polar displacing agent had been introduced into said zone, maintaining said zone at a temperature of 725°–775° F. during said reintroduction of said admixture whereby the bedlifting of the sieve is minimized.

3. The process of claim 1 wherein said displacing agent is ammonia.

4. The process of claim 1 wherein said displacing agent is ammonia.

References Cited

UNITED STATES PATENTS

| | | | |
|---|---|---|---|
| 2,886,508 | 5/1959 | Hess et al. | 260—676 |
| 2,924,630 | 2/1960 | Fleck et al. | 260—676 |
| 3,201,490 | 8/1965 | Lacey et al. | 260—676 |
| 3,278,422 | 10/1966 | Epperly et al. | 208—310 |
| 2,899,379 | 8/1959 | Wilchinsky et al. | 208—310 |

DELBERT E. GANTZ, *Primary Examiner.*

H. LEVINE, *Assistant Examiner.*

U.S. Cl. X.R.

260—676